Jan. 29, 1957
C. F. CARLZEN ET AL
2,779,385
ARTICLE HANDLING APPARATUS
Filed March 25, 1954
2 Sheets-Sheet 2
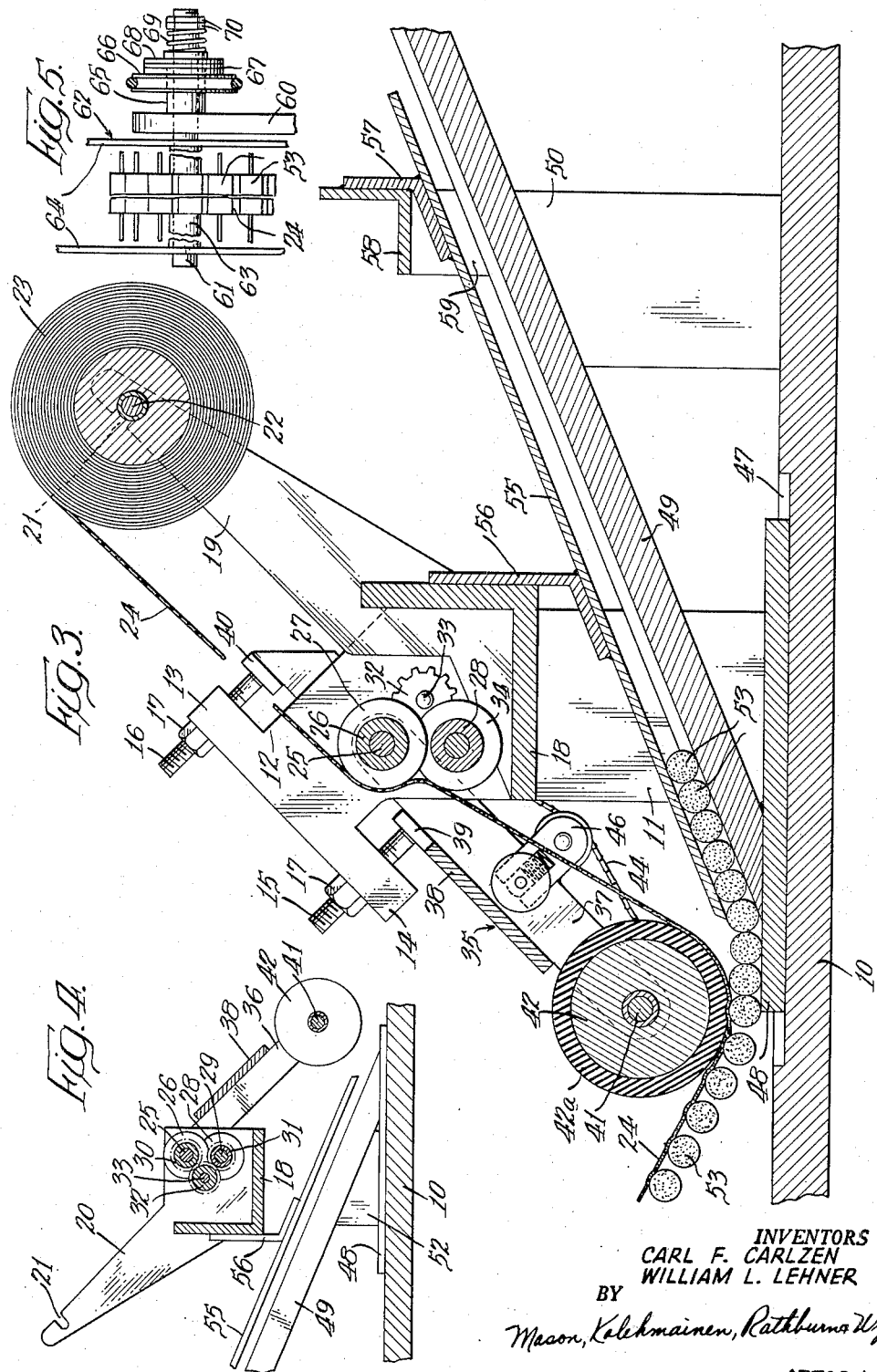
INVENTORS
CARL F. CARLZEN
WILLIAM L. LEHNER
BY
Mason, Kolehmainen, Rathburn & Wyss
ATTORNEYS.

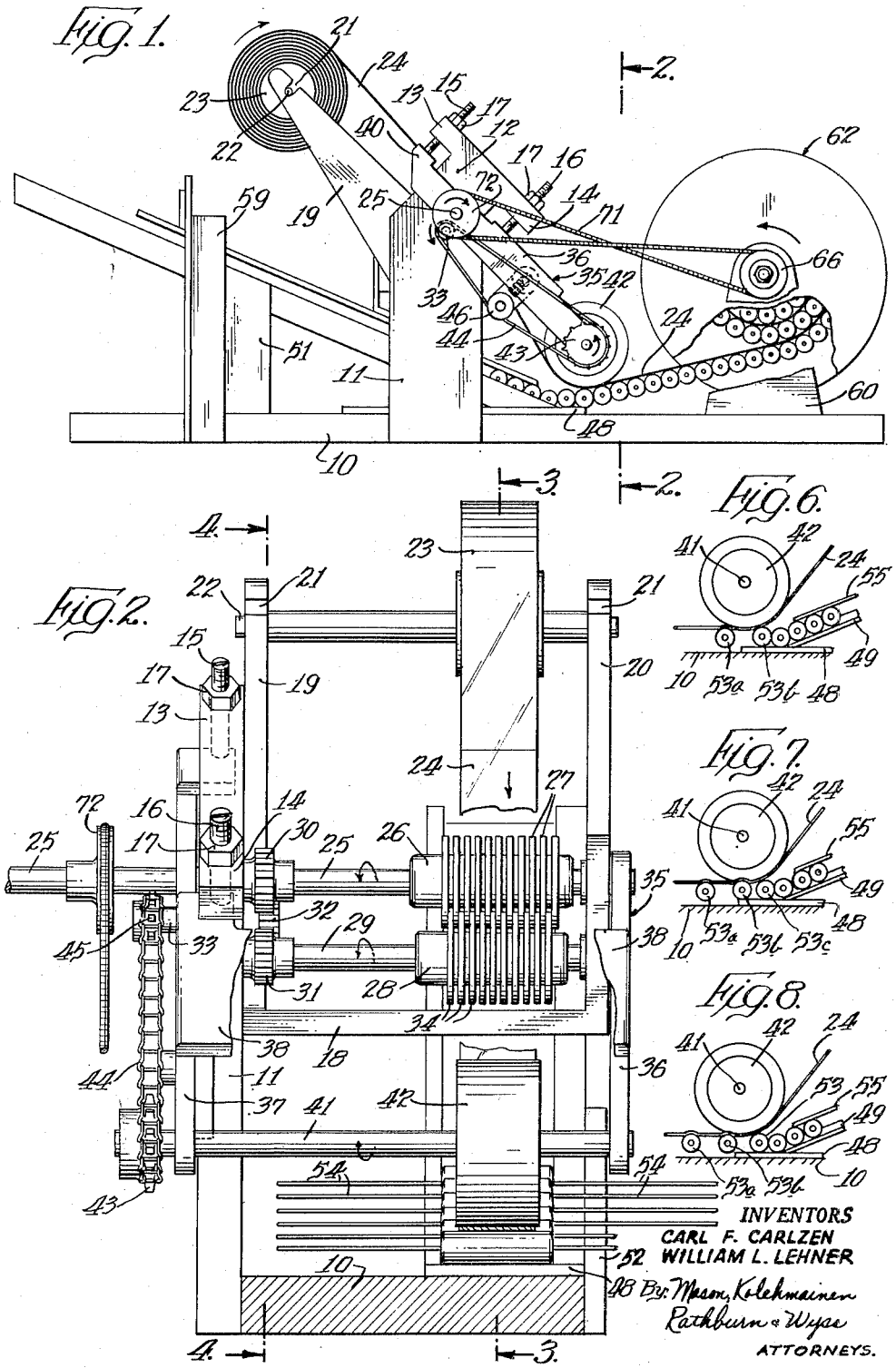

United States Patent Office 2,779,385
Patented Jan. 29, 1957

2,779,385
ARTICLE HANDLING APPARATUS

Carl F. Carlzen, Buffalo, and William L. Lehner, Snyder, N. Y., assignors to Sylvania Electric Products Inc., a corporation of Massachusetts Application March 25, 1954, Serial No. 418,670

12 Claims. (Cl. 154—1.6)

This invention relates to article handling apparatus, more particularly to apparatus for automatically forming a plurality of similarly shaped articles into a flexible belt to facilitate storage and subsequent use of the articles, and the invention has for an object the provision of highly efficient and fully automatic apparatus of this type.

The mechanization of factories, and particularly the mechanization of production lines which presently require the performance of numerous and precise manual operations, has recently become of increasing importance because of the necessity of reducing costs while maintaining or even improving quality, and numerous attempts have been made and are being made to provide automatic machinery for completely or at least partially mechanizing such production lines. This is particularly true in the manufacture of electronic apparatus such, for example, as radio and television receivers, in which a large number of components, i. e., resistors, capacitors, tube sockets, transformers and the like, must be assembled on a base or panel and electrically connected together in the desired circuit relationships.

While recent developments and improvements in so-called printed circuit techniques have enabled material forward steps, many difficulties still exist in the production of automatic machinery for assembling the components and completing the final electrical connections. One particular difficulty which arises is concerned with the feeding to the assembling apparatus of certain types of components which, as manufactured, include extending leads or terminals that tend to tangle, if resort is had to hopper feeding, thereby resulting in improper feeding of the components to the assembling apparatus. Since one of the advantages of mechanized assembly resides in the high speed of the operation, any failure of the components to feed properly seriously impairs the efficiency of the operation. Accordingly, it is a further object of the present invention to provide an improved component handling and storing apparatus that will, as a preliminary to the operation of the mechanized assembly line, form such components into flexible belts in which all of the articles are properly aligned and located with respect to each other, which belts may readily be stored in the form of coils and may, when desired, be fed into the automatic assembly apparatus so as to present the components to the manipulating elements of the apparatus in properly aligned and properly timed relation.

In carrying out the invention in one form an apparatus is provided comprising means for feeding the components or articles in aligned relation to a securing zone and means for applying to the corresponding surfaces of each of the articles as they pass through the securing zone an adhesive medium preferably in the form of a pressure sensitive adhesive tape to produce a flexible belt in which the articles are connected or bridged by the adhesive material. More particularly the apparatus comprises means for rotatably supporting, in spaced apart relation, a supply roll of adhesive tape and a storage reel for receiving the finished flexible belt, together with power driven tape dispensing means for withdrawing the tape from the supply roll at a predetermined rate and a pressure roll disposed intermediate the dispenser and the storage reel for applying the tape to the articles which are fed in aligned relation to a suitable pressure plate disposed adjacent the pressure roll. Where the articles are cylindrical in form and thus adapted to roll on the pressure plate the pressure roll is preferably formed of resilient material and is spaced from the pressure plate a distance slightly less than the diameter of the articles so that the tape will be wrapped around a portion of the circumference of each article depending upon the relative spacing. Means are also provided for varying this spacing to accommodate articles of different sizes and shapes and this adjustment is also effective to vary the extent to which the tape will be wrapped around articles of cylindrical shape.

The storage reel is positively driven so as to exert a constant tension on the tape, and in order to compensate for the increasing diameter of the coil as the finished belt is wound on the storage reel, the driving means for the reel includes a constant tension driving means such, for example, as a friction-type slip-clutch. The tension exerted on the tape after it leaves the pressure roll, where cylindrical articles are involved, determines the extent of the wrapped around surface of the article to which the tape will remain adhered in the final belt structure and the slip-clutch is preferably made adjustable so as to permit adjustment of the tension on the belt.

For a more complete understanding of the invention reference should now be had to the drawings in which:

Fig. 1 is an elevational view of one form of apparatus embodying the present invention;

Fig. 2 is an elevational sectional view, on a somewhat larger scale, taken substantially along the line 2—2 of Fig. 1 with some of the parts broken away in order more clearly to illustrate the construction;

Fig. 3 is a sectional view taken substantially along the line 3—3 of Fig. 2;

Fig. 4 is a fragmentary sectional view taken substantially along the line 4—4 of Fig. 2, but on the same scale as Fig. 1;

Fig. 5 is a fragmentary detailed view showing a portion of the driving means for the storage reel; and Figs. 6, 7 and 8 are somewhat diagrammatic views showing the manner in which the pressure plate and the pressure roll function to effect partial wrap around of the tape when the apparatus is employed in connection with cylindrical articles.

Referring now to the drawings, the invention is shown as embodied in an apparatus having a base plate 10 upon which all of the remaining portions of the apparatus are preferably supported. Extending upwardly from the base plate 10 intermediate the ends thereof is a supporting post 11 which is provided at its upper end with an obliquely extending portion 12 that terminates in a pair of outstanding arms 13 and 14 adapted threadedly to receive suitable adjusting screws 15 and 16, the purpose of which will be more fully described hereinafter, and each of which is provided with a suitable lock nut 17.

Suitably secured to the inner face of the post 11 as, for example, by welding, is a U-shaped frame comprising a transversely extending cross member 18 and a pair of rearwardly extending arms 19 and 20, each of which is provided adjacent its outer end with an open bearing or slot 21 for receiving in freely rotatable relation a shaft 22 adapted to carry a suitable supply roll 23 of any conventional type of pressure sensitive adhesive tape 24.

Extending transversely of the plate 10 adjacent the upper end of the post 11 is a main drive shaft 25 one end of which is journalled in the post 11 and extends therethrough for connection to a suitable source of power, not shown, and the other end of which is journalled in the leg 20 of the U-shaped frame on which the supply roll is supported. As shown in Fig. 3 the leg 19 of this U-shaped frame is cut away so as to avoid interference with the drive shaft 25. Mounted on the drive shaft 25 for rotation thereby is a suitable tape dispensing roll 26 which is of a type well known in the art and, as shown, includes a plurality of spaced discs 27 the edges of which are preferably serrated and which are adapted to engage the adhesive side of the tape 24 as shown best in Fig. 3 so as to withdraw the tape 24 from the supply roll 22 at a predetermined rate. Although a single tape dispensing roll may, in some instances, be all that is required, a second dispensing roll 28 is provided, in the apparatus shown, which second roll is mounted on a shaft 29 journalled similarly to the shaft 25 and adapted to be driven from the shaft 25 through a pair of gears 30 and 31, respectively, mounted on the shafts 25 and 29 and arranged to mesh with a suitable reversing gear 32 which is mounted on a stub shaft 33 journalled in the post 11 and extending outwardly of the post as shown in Fig. 2. By reason of this gear arrangement the dispensing rolls 26 and 28 are driven in the same direction and the spaced discs 34 which make up the dispensing roll 28 are arranged to interleave with the discs 27 of the dispensing roll 26.

Pivotally mounted on the main drive shaft 25 in non-driving relation thereto is a cradle 35 which is formed by a pair of side arms 36 and 37 connected together by a suitable cross piece 38. The cross piece 38 is provided with an extending lug 39 and a similar lug 40 is provided on the extending end of the side arm 37, the lugs 39 and 40 being disposed for engagement by the adjusting screws 15 and 16 whereby the cradle 35 may be adjusted to various angular positions about the drive shaft 25.

Extending between the lowermost ends of the side bars 36 and 37 of the cradle 35 and journalled for rotation therein is a shaft 41 on which is mounted a pressure roll 42 which is formed of resilient material and which, as shown in Fig. 3 includes an outer portion 42a formed of rubber or similar resilient material. In order positively to drive the pressure roll 42 at the desired speed of rotation one end of the shaft 41 is provided with a suitable sprocket 43 for engaging a drive chain 44 that also passes around sprocket 45 carried on the extending end of the stub shaft 33 which stub shaft is driven by the reversing gear 32. The chain 44 as shown best in Fig. 3 also passes around and is engaged by a spring pressed tension sprocket 46, of a type well known in the art, which sprocket is supported on the side bar 37 and serves to take up any slack in the chain 44 resulting from changes in the angular position of the pivoted cradle 35.

Adjacent the pressure roll 42 the base 10 as best shown in Fig. 3 is provided with a longitudinally extending slot 47 for receiving a suitable pressure plate 48 which is adapted to cooperate with the pressure roll 42 to automatically apply the tape 24 to suitable articles that are fed in aligned relation to the pressure roll. As shown in the drawings, the pressure plate 48 carries an inclined chute 49 which extends rearwardly and upwardly from a point adjacent the front of the pressure plate and which is supported adjacent the rear end of the base plate 10 by a pair of upstanding posts 50 and 51. The chute 49 may also be secured, if desired, to a supporting member 52 which extends upwardly from the plate 10 on the side thereof opposite from the post 11. The articles to be formed into a flexible belt in accordance with the present invention are fed by gravity down the chute 49 so as to be presented in aligned relation to the pressure roll 42 and, in the drawings, these articles are shown for purposes of illustration as comprising a plurality of conventional resistors 53 which are of a type well known in the art and which include suitable lead wires 54 extending outwardly from the cylindrical body portion of the resistors. In order to maintain the resistors 53 in properly aligned relation during their movement down the chute 49 a guide plate 55 is provided which is spaced from the chute 49 and which is suitably supported adjacent its lower end by an angular member 56 carried by the cross bar 18 and which is supported at its upper end on a similar angular member 57 carried by a transversely extending angular member 58 that is supported at its opposite ends on a pair of upstanding posts 59 secured at their lower ends to the base 10.

As shown in Figs. 1 and 5 the finished flexible belt comprising the tape 24 with the resistors 53 applied thereto passes from the pressure roll 42 to a suitable storage reel on which it is wound, and in order properly to support and drive the storage reel the base 10 is provided near its right-hand end as viewed in Fig. 1 with an upstanding post 60 in which is journalled a transversely extending shaft 61 the left-hand end of which as viewed in Fig. 5 constitutes a spindle for supporting and driving the storage reel 62. This storage reel which may be mounted on the spindle 61 in driving relation either by a friction or splined connection constitutes a conventional spool rotatably mounted on the shaft 61 and having a hollow cylindrical core 63 and side flanges 64.

On the opposite side of the supporting post 60 from the reel 62, the shaft 61 carries a hollow shaft or sleeve 65 which in turn carries a pulley 66 to which is secured one element 67 of a conventional friction type disc clutch, the cooperating element 68 of the friction clutch being carried by and secured to the shaft 61. Mounted on the shaft 61 outwardly of the clutch disc 68 is a suitable spring 69 one end of which engages the disc 68 and the other end of which is engaged by suitable adjusting nuts 70 which are threaded on the end of the shaft. It will thus be apparent that when the pulley 66 is driven, the shaft 61 will be correspondingly driven through the friction clutch until such time as the load imposed on the shaft 61 by the storage reel 62 increased sufficiently to cause slippage of the clutch discs 67 and 68, and it will likewise be apparent that adjustment of the spring 69 by means of the adjusting nuts 70 will be effective to vary the point at which the clutch will slip and thus vary the tension exerted on the tape 24 by the reel 62. As shown in Figs. 1 and 2 the pulley 66 is driven by a crossed belt 71 which in turn is driven by a suitable pulley 72 carried on the main drive shaft 25.

Considering now the operation of the apparatus heretofore described, the resistors 53, or such other articles as it may be desired to incorporate into a flexible belt, may be fed to the upper end to the chute 49 either from a hopper or directly from other apparatus employed to fabricate or condition the resistors such, for example, as a lead straightening apparatus. It will be understood that since the present apparatus does not form a part of a high speed production line difficulties encountered in hopper feeding are not so important and proper feeding of the resistors from a hopper may be accomplished with a minimum of supervision.

When the resistors 53 reach the bottom of the chute 49 they will move across the pressure plate 48 under the force exerted by the following resistors and as the tape 24 which passes around the lower portion of the pressure roll 42 engages each individual resistor, that resistor will be caused to roll across the pressure plate so as to move away from the following resistor a short distance determined by the spacing between the pressure roll 42 and the pressure plate 48 and by the speed of rotation of the pressure roll. It will be understood, of course, that by properly positioning the chute 49 relative to the pressure roll 42, the guide plate 55 being appropriately shortened, the pressure plate 48 may be omitted and the resistors 53 may be engaged between the pressure roll 42 and the lower portion of the inclined chute 49 so as to apply the adhesive tape to the resistors.

In Figs. 6, 7 and 8 the manner in which the tape is caused to wrap around the resistors to the desired extent is illustrated somewhat diagrammatically. In Fig. 6 the first resistor 53a is shown leaving the pressure roll 42 just as a second resistor 53b moves into engagement with the roll, while in Fig. 7 the resistor 53a has moved further away, the resistor 53b is in the middle of the tape applying movement and has moved slightly away from the following resistor 53c which is just about to be engaged by the tape 24 on the roll 42. Likewise in Fig. 8 the resistor 53a has advanced still further, the resistor 53b has rolled further away from the resistor 53c and this latter resistor has been engaged by the tape 24 and is about to move under the roll 42.

By adjusting the pivoted cradle 35 on which the roll 42 is carried so as to increase or decrease the spacing of the roll 42 from the pressure plate 48 the extent to which the tape 24 will be wrapped around the resistors may be varied and likewise the pressure roll 42 may be moved to accommodate articles of different size and shape. This adjustment of the position of the pressure roll 42 may be accomplished as heretofore indicated by loosening the lock nuts 17 on the adjusting screws 15 and 16 and then adjusting these screws in opposite directions so as to effect pivotal movement of the cradle about its pivotal axis on the shaft 25.

While one of the primary objects in driving the storage reel 62 through a constant tension slip clutch is to compensate for the increasing diameter of the coil as the flexible belt of articles is wound thereon, this constant tension drive is also effective to determine the extent of the wrapped around surface of cylindrical resistors or similar articles to which the tape 24 will adhere in the finished belt structure. For example, it will be apparent upon consideration of Figs. 6, 7 and 8, that as the tension on the tape 24 as it leaves the roll 42 increases the tape will tend to straighten out and pull away from the wrapped around portions of the resistors. In fact if this tension is sufficiently increased the contact of the tape with the cylindrical resistors would be reduced to a line contact, which would obviously be insufficient to retain the resistors on the tape. On the other hand, the relative diameters of the roll 42 and the resistors 53, and the spacing of the roll 42 from the plate 48 may effect a greater wrap around and a consequent closer spacing of the resistors than is desired in the finished belt. By properly adjusting the slip clutch to provide the desired tension on the tape 24 the extent of the wrap around achieved in the final product may be varied as desired.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. In an apparatus of the class described, the combination of means for feeding a plurality of similarly shaped articles to a securing zone in aligned relation to each other, means for feeding a pressure sensitive adhesive tape to said zone, means at said zone including a pressure roll for sequentially applying said tape to corresponding surfaces of said articles to form a flexible belt of said articles, a storage reel, and constant tension means for driving said reel to withdraw said belt from said zone under constant tension and to wind said belt on said reel.

2. In an apparatus of the class described, the combination of means including an inclined chute for feeding a plurality of similar cylindrical articles in sequence to a securing zone adjacent the lower end of said chute, a pressure plate in said zone, means for feeding an adhesive tape to said zone, means including a resilient pressure roll spaced from said pressure plate a distance slightly less than the diameter of said articles for applying said tape to said articles in sequence and advancing said articles through said zone between said roll and said plate to form a flexible belt with said articles secured to said tape in parallel relation to each other, and constant tension means for withdrawing said belt from said zone.

3. In an apparatus of the class described, the combination of means including an inclined chute for feeding a plurality of similar cylindrical articles in sequence to a securing zone adjacent the lower end of said chute, a pressure plate in said zone, means for feeding an adhesive tape to said zone, means including a resilient pressure roll spaced from said pressure plate a distance slightly less than the diameter of said articles for applying said tape to said articles in sequence and advancing said articles through said zone between said roll and said plate to form a flexible belt with said articles secured to said tape in parallel relation to each other, means for adjusting the spacing of said roll from said plate to vary the extent of the surface of said articles to which said tape is applied by said roll, and means for withdrawing said belt from said zone.

4. In an apparatus of the class described, the combination of means including an inclined chute for feeding a plurality of similar cylindrical articles in sequence to a securing zone adjacent the lower end of said chute, a pressure plate in said zone, means for feeding an adhesive tape to said zone, means including a resilient pressure roll spaced from said pressure plate a distance slightly less than the diameter of said articles for applying said tape to said articles in sequence and advancing said articles through said zone between said roll and said plate to form a flexible belt with said articles secured to said tape in parallel relation to each other, means for adjusting the spacing of said roll relative to said plate to vary the extent of the surface of said articles to which said tape is applied by said roll, means for withdrawing said belt from said zone and applying a constant tension to said tape to adjust the extent of said applied surfaces to said articles to which said tape adheres, and means for varying said tension.

5. In an apparatus of the class described, the combination of means including an inclined chute for feeding a plurality of similar cylindrical articles in sequence to a securing zone adjacent the lower end of said chute, a pressure plate in said zone, means for feeding an adhesive tape to said zone, means including a resilient pressure roll spaced from said pressure plate a distance slightly less than the diameter of said articles for applying said tape to said articles in sequence and advancing said articles through said zone between said roll and said plate to form a flexible belt with said articles secured to said tape in parallel relation to each other, means for adjusting the spacing of said roll relative to said plate to vary the extent of the surface of said articles to which said tape is applied by said roll, a storage reel to withdraw said belt from said reel and to wind said belt on said reel, constant tension means for driving said reel, and means for adjusting said tension to vary the extent of said applied surfaces of said articles to which said tape adheres.

6. An apparatus for forming a plurality of similar articles into a flexible belt to facilitate storage and subsequent use of said articles, comprising a supply roll of adhesive tape, a storage reel, means for rotatably supporting said roll and said reel in spaced apart relation, tape dispensing means intermediate said roll and said reel, means for driving said dispensing means to withdraw tape from said supply roll at a predetermined rate and to supply said tape to said reel, a pressure roll rotatably supported for engaging the non-adhesive side of said tape intermediate said dispensing means and said reel, means for feeding said articles in aligned relation to said pressure roll for application of said tape thereto to form a flexible belt of said articles, and means for connecting said pressure roll and said reel to said driving means for rotation thereby, said connection to said reel including a constant tension slip connection.

7. An apparatus for forming a plurality of similar articles into a flexible belt to facilitate storage and subsequent use of said articles, comprising a supply roll of adhesive tape, a storage reel, means for rotatably supporting said roll and said reel in spaced apart relation, tape dispensing means intermediate said roll and said reel, means for driving said dispensing means to withdraw tape from said supply roll at a predetermined rate and to supply said tape to said reel, a pressure roll rotatably supported for engaging the non-adhesive side of said tape intermediate said dispensing means and said reel, means for feeding said articles in aligned relation to said pressure roll for application of said tape thereto to form a flexible belt of said articles, said feeding means including a pressure plate spaced from said roll to support said articles during application of said tape thereto by said roll, and means for connecting said pressure roll and said reel to said driving means for rotation thereby, said connection to said reel including a constant tension slip connection.

8. An apparatus for forming a plurality of similar articles into a flexible belt to facilitate storage and subsequent use of said articles, comprising a supply roll of adhesive tape, a storage reel means for rotatably supporting said roll and said reel in spaced apart relation, tape dispensing means intermediate said roll and said reel, means for driving said dispensing means to withdraw tape from said supply roll at a predetermined rate and to supply said tape to said reel, a pressure roll rotatably supported for engaging the non-adhesive side of said tape intermediate said dispensing means and said reel, means for feeding said articles in aligned relation to said pressure roll for application of said tape thereto to form a flexible belt of said articles, said feeding means including a pressure plate spaced from said roll to support said articles during application of said tape thereto by said roll, means for connecting said pressure roll and said reel to said driving means for rotation thereby, said connection to said reel including a constant tension slip connection, means for adjusting the spacing between said pressure roll and said pressure plate, and means for adjusting said slip connection to vary the tension on said tape.

9. An apparatus for forming a plurality of similar articles into a flexible belt to facilitate storage and subsequent use of said articles, comprising a supply roll of adhesive tape, a storage reel, a frame, means on said frame for rotatably supporting said roll and said reel in spaced apart relation, a tape dispensing roll journalled in said frame intermediate said supply roll and said reel for engaging an adhesive surface of said tape, means for driving said dispensing roll to withdraw said tape from said supply roll at a predetermined rate, means for rotating said reel to wind thereon the tape withdrawn by said dispensing roll, a cradle pivoted on said frame, a pressure roll carried by said cradle for engaging said tape intermediate said dispensing roll and said reel, an inclined chute terminating in a pressure plate disposed adjacent said pressure roll for feeding said articles in aligned relation to said pressure roll for sequential application of said tape thereto as said articles pass over said pressure plate thereby to form a flexible belt of said articles, and interengaging means on said frame and said cradle for adjusting the relative spacing of said pressure roll and said pressure plate, said means for rotating said reel including slip-clutch means for maintaining constant the tension on the portion of said tape between said dispensing means and said reel.

10. An apparatus for forming a plurality of similar articles into a flexible belt to facilitate storage and subsequent use of said articles, comprising a supply roll of adhesive tape, a storage reel, means for rotatably supporting said roll and said reel in spaced apart relation, tape dispensing means intermediate said roll and said reel, means for driving said dispensing means to withdraw tape from said supply roll at a predetermined rate and to supply said tape to said reel, a pressure roll rotatably supported for engaging the non-adhesive side of said tape intermediate said dispensing means and said reel, means for feeding said articles in aligned relation to said pressure roll for application of said tape thereto to form a flexible belt of said articles, and means for connecting said pressure roll and said reel to said driving means for rotation thereby.

11. In an apparatus of the class described, the combination of means for feeding a plurality of similarly shaped articles to a securing zone in aligned relation to each other, means for feeding a pressure sensitive adhesive tape to said zone, means at said zone including a resilient pressure roll for sequentially applying said tape to corresponding surfaces of said articles to form a flexible belt of said articles, a storage reel, and means for driving said storage reel to wind said belt on said reel.

12. In an apparatus of the class described, the combination of means for feeding a plurality of similarly shaped articles to a securing zone in aligned relation to each other, means for feeding a pressure sensitive adhesive tape to said zone, means at said zone including a resilient pressure roll for sequentially applying said tape to corresponding surfaces of said articles with said tape partially wrapped around each article, and means for withdrawing said tape from the securing zone under a constant tension.

References Cited in the file of this patent

UNITED STATES PATENTS

| 1,315,167 | Semashko | Sept. 2, 1919 |
| 2,456,059 | Grupe | Dec. 14, 1948 |
| 2,641,298 | Kinnear | June 9, 1953 |